US010201962B2

(12) United States Patent
Teulet (10) Patent No.: US 10,201,962 B2
(45) Date of Patent: Feb. 12, 2019

(54) DEVICE FOR MANUFACTURING THREE-DIMENSIONAL OBJECTS USING SUPERIMPOSED LAYERS, AND ASSOCIATED METHOD OF MANUFACTURE

(71) Applicant: PHENIX SYSTEMS, Riom (FR)

(72) Inventor: Patrick Teulet, Riom (FR)

(73) Assignee: PHENIX SYSTEMS, Riom (FR)

( * ) Notice: Subject to any disclaimer, the term of this patent is extended or adjusted under 35 U.S.C. 154(b) by 721 days.

(21) Appl. No.: 14/417,261

(22) PCT Filed: Jul. 26, 2013

(86) PCT No.: PCT/EP2013/065783
§ 371 (c)(1),
(2) Date: Jan. 26, 2015

(87) PCT Pub. No.: WO2014/016402
PCT Pub. Date: Jan. 30, 2014

(65) Prior Publication Data
US 2015/0210013 A1    Jul. 30, 2015

(30) Foreign Application Priority Data

Jul. 27, 2012 (FR) .................................. 12 57327

(51) Int. Cl.
*B29C 67/00* (2017.01)
*B33Y 30/00* (2015.01)
(Continued)

(52) U.S. Cl.
CPC ............ *B33Y 30/00* (2014.12); *B22F 3/1055* (2013.01); *B23K 26/082* (2015.10);
(Continued)

(58) Field of Classification Search
CPC ... B29C 64/135; B29C 64/153; B29C 64/268; B33Y 10/00; B33Y 30/00; B33Y 50/00; B33Y 50/02
See application file for complete search history.

(56) References Cited

U.S. PATENT DOCUMENTS 6,861,613 B1    3/2005 Meiners et al.
7,758,329 B2*   7/2010 Kihara .................. B33Y 30/00
                                                        264/492
(Continued)

FOREIGN PATENT DOCUMENTS

DE    19935274 C1    1/2001
JP    H04-113828     4/1992
(Continued)

OTHER PUBLICATIONS

International Search Report, dated Nov. 13, 2013, from corresponding PCT application.

*Primary Examiner* — Ryan M Ochylski
(74) *Attorney, Agent, or Firm* — Young & Thompson (57) ABSTRACT

A device for manufacturing three-dimensional objects using superimposed layers is capable, for each layer to be manufactured, of applying a laser beam treatment to a layer of a pulverulent material or liquid placed in a sintering field. The device includes a galvanometric head able to steer a laser beam toward each point of a maximum sintering zone of the sintering field when the galvanometric head is positioned at a predetermined position. The device further includes limiting elements for limiting the steering of the laser beam to an effective sintering zone situated inside the maximum sintering zone, and movement elements for moving the galvanometric head in a plane parallel to that of the sintering field, allowing the galvanometric head to be positioned at at least two different positions, an effective sintering zone being associated with each position of the galvanometric head. An associated method of manufacturing three-dimensional objects is described.

9 Claims, 6 Drawing Sheets

(51) Int. Cl.
*B22F 3/105* (2006.01)
*B23K 26/08* (2014.01)
*B23K 26/34* (2014.01)
*B33Y 10/00* (2015.01)
*B23K 26/082* (2014.01)
*B29C 64/135* (2017.01)
*B29C 64/141* (2017.01)
*B29C 64/153* (2017.01)
*B29C 64/386* (2017.01)

(52) U.S. Cl.
CPC .......... *B23K 26/0876* (2013.01); *B23K 26/34* (2013.01); *B29C 64/135* (2017.08); *B29C 64/141* (2017.08); *B29C 64/153* (2017.08); *B29C 64/386* (2017.08); *B33Y 10/00* (2014.12); *B22F 2003/1057* (2013.01); *Y02P 10/295* (2015.11)

(56) References Cited

U.S. PATENT DOCUMENTS

2004/0094728 A1   5/2004   Herzog et al.
2008/0157412 A1*  7/2008   Kihara .................. B33Y 30/00
                                              264/1.1

FOREIGN PATENT DOCUMENTS

| JP | H05-315262 A | 11/1993 |
| JP | 2003-505250  | 2/2003 |
| JP | 2003-505250 A | 2/2003 |
| WO | 02-36331 | 5/2002 |
| WO | 200537478 A2 | 4/2005 |

* cited by examiner

DEVICE FOR MANUFACTURING THREE-DIMENSIONAL OBJECTS USING SUPERIMPOSED LAYERS, AND ASSOCIATED METHOD OF MANUFACTURE

FIELD OF THE INVENTION

The present invention relates to a device for manufacturing three-dimensional objects using superimposed layers, able to apply, for each layer to be manufactured, laser beam solidification of a layer of a powdery or liquid material placed in a sintering field and an associated manufacturing method.

The invention falls in the technical field of producing three-dimensional objects by laser treatment, in particular by laser sintering.

DESCRIPTION OF THE PRIOR ART

It is known to produce three-dimensional objects with any shape whatsoever using layer-by-layer additive manufacturing by laser sintering. Such a manufacturing method includes depositing a layer of powdery or liquid material on a substrate, which may be a previously solidified layer of the object to be manufactured. The layer of powdered or liquid material is gradually solidified by applying a laser beam, also called lasing, in a zone defined by a two-dimensional section of the object to be manufactured. Thus, a three-dimensional object is manufactured by stacking layers, each layer corresponding to a two-dimensional section of the object to be manufactured.

In a known manner, an installation for manufacturing by laser treatment using superimposed layers comprises an electromagnetic radiation source or a laser source able to emit a laser beam, and a galvanometric head, able to shape the laser beam coming from the laser source and steer it in a sintering field, which is situated in the plane XY and on which the layer of liquid or powdery material to be solidified by the laser is positioned.

The galvanometric head in particular comprises means for shaping the laser beam and means for deflecting the laser beam in the sintering plane, steered by a central unit in order to trace various paths in the sintering field, thereby making it possible to form a two-dimensional section with any shape whatsoever of the object to be manufactured.

The galvanometric head also comprises a device making it possible to focus the laser beam in the sintering plane, which may for example be a flat field lens placed downstream from the deflecting means of the beam and/or a device modifying the focal distance placed upstream from the beam deflecting means.

Traditionally, the beam deflecting means for example comprise mirrors mounted on galvanometric motors, for example two mirrors whose axes are perpendicular. The angular travel of the mirrors being bounded, the maximum sintering zone of the sintering field is also limited, for a given distance between the galvanometric head and the sintering field. The size of the maximum sintering zone also depends on the type of device making it possible to focus the laser beam in the sintering field; it is more restricted in the case of a flat field lens. This is a first limitation of the known manufacturing installations using laser treatment with superimposed layers.

Furthermore, it has been observed that the reflection coefficient on the mirrors varies depending on the incidence angle of the laser beam. For an incidence angle smaller than 45°, 99% of the electromagnetic wave is reflected, whereas beyond that angular value, a wave polarized in the incidence plane is significantly attenuated. Thus, there is a strong variation of the intensity reflected between the center of the maximum sintering zone and the edges of the maximum sintering zone.

Furthermore, it has also been noted that a circular beam at the center of the maximum sintering zone, therefore at a zero incidence angle, assumes an elliptical shape on the edges of the maximum sintering zone. This phenomenon is called "ovalization" of the beam intercepted on the edges of the maximum sintering zone. The variation of the surface of the beam intercepted on the sintering zone causes a variation in the electromagnetic radiation intensity. Thus, the laser beam treatment is not homogenous between the center of the maximum sintering zone and on its edges.

In the event the device making it possible to focus the laser beam in the sintering field is a flat field lens, it has also been observed that there is a variation in the radius of the beam intercepted on the sintering field based on its position in the sintering field, which causes a variation of the radiated surface and therefore of the electromagnetic radiation intensity.

It thus appears that the known manufacturing installations using the laser treatment with superimposed layers do not allow homogenous treatment of the layer over the entire possible maximum sintering zone, the size of which is also limited.

There is therefore a need to improve the quality and capacity of the sintering treatment of such installations.

OBJECTS AND SUMMARY OF THE INVENTION

To that end, the invention proposes a device for the manufacture of three-dimensional objects using superimposed layers which is capable, for each layer that is to be manufactured, of applying a laser beam treatment to a layer of powdery or liquid material placed in a sintering field, said device comprising a galvanometric head able to steer a laser beam toward each point of a maximum sintering zone of said sintering field when said galvanometric head is positioned at a predetermined position.

The device is remarkable in that it further comprises:
  limiting means able to limit the steering of the laser beam to an effective sintering zone, situated inside said maximum sintering zone, and
  movement means for moving said galvanometric head into a plane parallel to the plane of said sintering field, making it possible to position said galvanometric head in at least two different positions, an effective sintering zone being associated with each position of said galvanometric head.

Advantageously, the global sintering zone, which is the sum of the effective sintering zones, is extended, while ensuring homogenous treatment inasmuch as each of the effective sintering zones is contained inside the maximum sintering zone.

The device for the manufacture of three-dimensional objects using superimposed layers can also have one or more of the features below:
  one said effective sintering zone is centered in said maximum sintering zone, around a point corresponding to a normal incidence of said laser beam on the sintering field;
  it further comprises means for deflecting the laser beam and a device able to focus said laser beam in the sintering field placed upstream from said deflecting means, and said effective sintering zone is off-centered relative to said maximum sintering zone;

it further comprises means for controlling the movement means, able to control the positioning of said galvanometric head in a plurality of positions so as to cover a global sintering zone with a plurality of effective sintering zones;

said effective sintering zones covering said global sintering zone are adjacent;

said effective sintering zones covering said global sintering zone comprise overlap zones;

said global sintering zone is a two-dimensional section of a three dimensional object to be manufactured.

According to a second aspect, the invention relates to a method for the manufacture of three-dimensional objects using superimposed layers comprising, for each layer to be manufactured, a step for laser beam treatment of a layer of a powdery or liquid material placed in a sintering field, implemented by steering of at least one laser beam in a maximum sintering zone of said sintering field by a galvanometric head positioned at a predetermined position. The method is remarkable in that it comprises, for the treatment of one said current layer, the following steps:

determining an effective sintering zone associated with a predetermined position of said galvanometric head, said effective sintering zone being positioned inside said maximum sintering zone;

obtaining at least one global sintering zone;

determining a plurality of effective sintering zones suitable for covering said at least one global sintering zone and of a position of said galvanometric head associated with each effective sintering zone;

controlling the movement of said galvanometric head to at least one predetermined position, and applying a laser beam treatment in the effective sintering zone associated with the position of the galvanometric head.

The method for the manufacture of three-dimensional objects using superimposed layers has advantages similar to the advantages of the device for the manufacture of three-dimensional objects using superimposed layers according to the invention.

According to one feature, at least two effective zones from said plurality of sintering zones comprise an overlap zone, and the method further comprises, for each of said effective zones, a step for determining scanning paths by the laser beam, the paths done in two effective zones having an overlap zone being interlaced in said overlap zone.

According to one feature, in the step for determining a plurality of effective sintering zones, a positioning of each effective sintering zone takes into account a predetermined positioning of effective sintering zones for a layer preceding said current layer.

According to a third aspect, the invention relates to an installation for the manufacture of three-dimensional objects using superimposed layers comprising at least two devices for the manufacture of three-dimensional objects using superimposed layers as briefly described above, said devices each being able to steer a laser beam coming from an electromagnetic radiation source associated with said device, toward a shared sintering field.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF THE PREFERRED EMBODIMENTS

Figure 1:
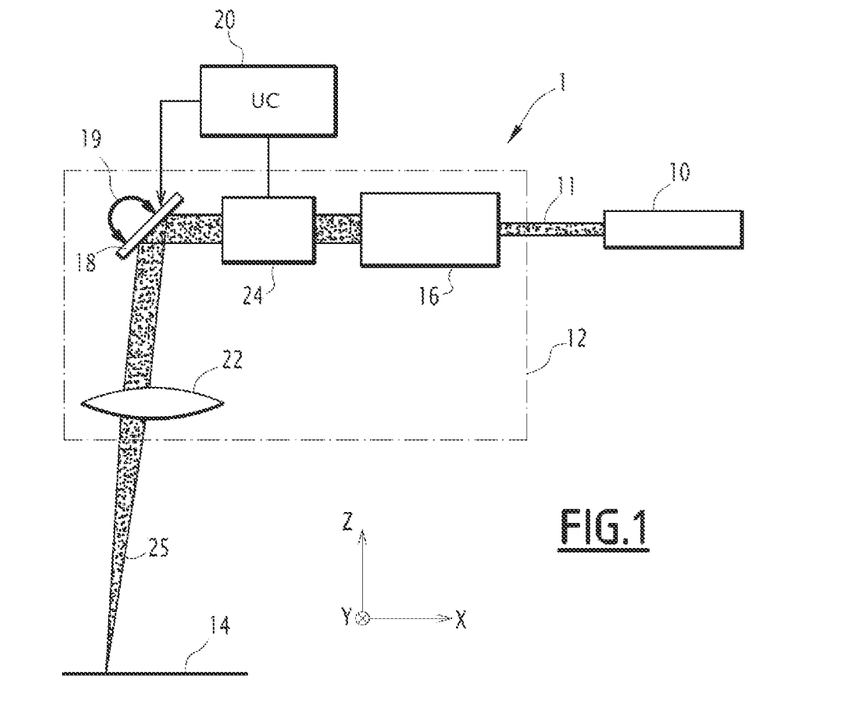
FIG. 1 is a schematic diagram of an installation for the manufacture of three-dimensional objects by laser sintering using layers.

FIG. 1 shows a manufacturing installation 1 using laser treatment of superimposed layers. The installation 1 comprises an electromagnetic radiation source or laser source 10 capable of emitting a laser beam 11, and a galvanometric head 12 capable of shaping the laser beam 11 coming from the laser source 10 and steering it in a sintering field 14, which is situated in a spatial plane XY, an orthogonal reference XYZ of which is shown in the figure, and on which the layer of liquid or powdered material to be solidified by the laser is positioned.

The galvanometric head 12 in particular comprises means 16 for shaping the laser beam 11 and means 18 for deflecting the laser beam in the sintering field 14. The means 18 for deflecting the laser beam are steered by a central unit 20 in order to trace various paths in the sintering field 14, thereby making it possible to gradually solidify a two-dimensional section with any shape whatsoever of an object to be manufactured.

In one embodiment, the means 18 for deflecting the laser beam comprise two mirrors mounted on galvanometric motors, the axes of which are perpendicular. In FIG. 1, only one mirror is shown, and a galvanometric motor is diagrammed by an arrow illustrating the motion of the mirror.

The galvanometric head 12 also comprises a device making it possible to focus the laser beam in the sintering field 14 which, according to a first embodiment, is a flat field lens 22, known as an F-Theta lens, placed downstream from the beam deflecting means 18.

According to a second embodiment, the device making it possible to focus the laser beam in the sintering field 14 is a so-called "third axis" device 24, modifying the focal distance, placed upstream from the beam deflecting means 18. In one embodiment, the device 24 is a lens motorized along the axis of the beam 11. Alternatively, the device 24 is a variable focus lens. The central unit 20 is also capable of steering the device 24 in order to adjust the focal distance.

According to a third embodiment, the device making it possible to focus the laser beam in the sintering field 14 is made up of a combination of a "third axis" type device and a flat field focusing lens.

The beam 25 coming from the galvanometric head 12 intersects the sintering field 14. The physical limits of the movement of the beam 25 in the sintering field, in particular due to the angular travel of the mirrors making up the deflecting means 18, define a maximum sintering zone in the sintering field. For example, for an angular travel of the mirrors bounded to +/−20 degrees, and a distance separating the last diopter of the galvanometric head from the sintering field of 500 mm, called working distance, the maximum sintering zone is a square with sides measuring 290 mm in the first embodiment with a flat field lens 22 and 418 mm for the second embodiment with a so-called "third axis" device 24.

The galvanometric head 12 and the laser electromagnetic energy source 10 form an optical treatment chain.

Figure 2:
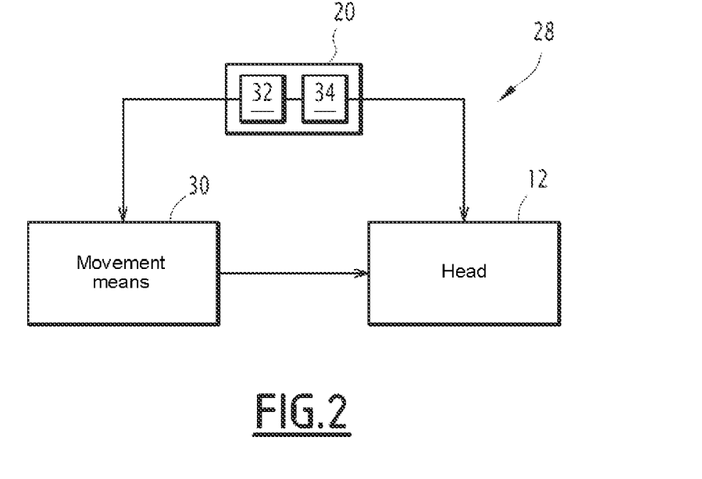
FIG. 2 is a block diagram of a device for the manufacture of three-dimensional objects by laser sintering using layers according to the invention.

A device 28 for manufacturing objects by laser sintering using layers, diagrammatically illustrated in FIG. 2, comprises, in addition to the elements described above in reference to FIG. 1, means 30 for translating the galvanometric head in a plane parallel to the plane of the sintering field, making it possible to position the galvanometric head in at least two different positions and potentially enlarge the global sintering zone on which laser treatment can be done. The means 30 are implemented by any known mechanical means. The systems implemented for these movements are for example mechanical screw-nut systems with precision balls driven by "brushless" motors or linear motors, while being positioned and guided by precision rails and ball skates.

Thus, a global sintering zone with any size, for example 1000×2000 mm, can be achieved.

The central unit 20 comprises means 32, for example implemented by a software module, able to supply steering commands for the means 30 moving the galvanometric head and therefore to position the galvanometric head in a predetermined spatial location in a plane parallel to the sintering field 14.

Furthermore, the central unit 20 has limiting or restricting means 34, for example implemented by a software module, able to send commands to the means 18 for deflecting the laser beam of the galvanometric head 12 making it possible to limit the beam to a so-called effective sintering zone (for example, zone referenced 36 in FIG. 3 described in detail below), the effective sintering zone being situated inside the maximum sintering zone (40 in FIG. 3), which can be swept by the laser beam when the galvanometric head is in a given position. In particular, the movement of the mirror(s) is limited to a given angular movement interval, for example from 6° to 7° maximum amplitude, for which the reflexivity of the mirrors is optimal. The effective sintering zone is situated inside the maximum sintering zone, and is preferably placed so as to ensure better homogeneity of the reflected intensity and electromagnetic radiation intensity and to reduce any ovalization effect of the laser beam intercepting the sintering field in that effective sintering zone.

Figure 3:
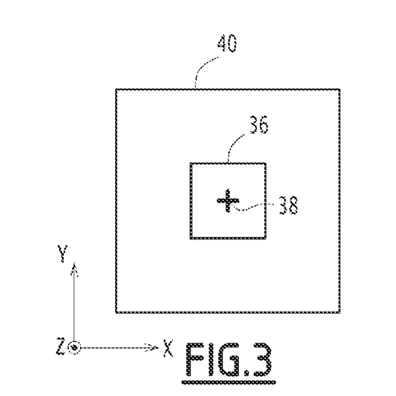
FIG. 3 shows an effective sintering zone according to one embodiment of the invention.

FIG. 3 illustrates, in top view of the sintering field, a first embodiment in which the effective sintering zone 36 is a reduced zone centered on the optical axis 38, incidence point perpendicular to the beam 25 coming from the galvanometric head 12. For example, the surface 36 has dimensions of approximately ⅑ of the maximum sintering surface 40 (i.e., a square with ⅓ the side of the maximum square).

For example, if the effective sintering zone is limited to 100×100 mm for a working distance of 500 mm, it has been observed that the reflection loss is limited to 1.2% on the edges of the effective sintering zone. In the first embodiment with a flat field lens 22 of type f420, the diameter of the beam intercepted in the effective sintering zone varies between 55 μm and 57 μm only, therefore a difference of only 3.6%; consequently, the radiated surface variation and therefore the electromagnetic radiation intensity variation is also limited in that case.

Figure 4:
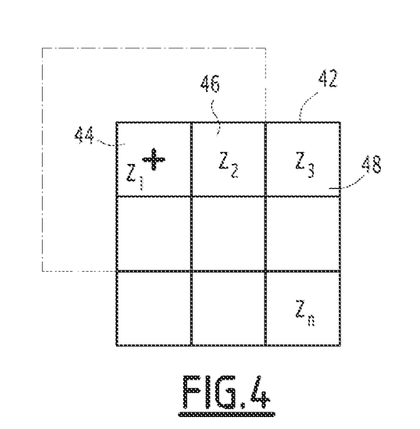
FIG. 4 shows a partition of a global sintering zone into effective sintering zones according to a first embodiment of the invention.

FIG. 4 illustrates obtaining a global sintering zone 42 by adding adjacent effective sintering zones $Z_1, Z_2, Z_3 \ldots Z_n$. The illustrated effective sintering zones, respectively denoted 44, 46, 48, are adjacent and form a portion of the global sintering zone. Each of the effective sintering zones is obtained by positioning the sintering head using the movement means. In the example of FIG. 4, each effective sintering zone is centered on the optical axis associated with the corresponding position of the sintering head. For example, the position of the galvanometric head associated with the effective zone 44 is illustrated in dotted lines in FIG. 4.

Figure 5:
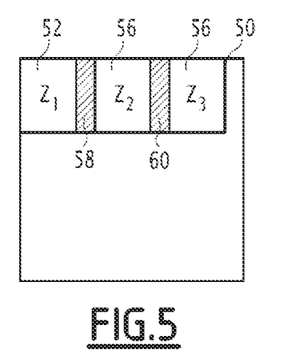
FIG. 5 shows a global sintering zone made up of several effective sintering zones according to a second embodiment of the invention.

According to a second embodiment, illustrated in FIG. 5, it is considered to form a global sintering zone 50 from effective sintering zones $Z_1, Z_2, Z_3$, respectively denoted 52, 54, 56, that overlap on respective portions 58, 60, in order to facilitate continuity of the laser interaction on the edges between two successive effective sintering zones corresponding to positions of the galvanometric head, thereby making it possible to decrease the corresponding marking effect at the edges of the zones of a layer to be manufactured.

Figure 6:
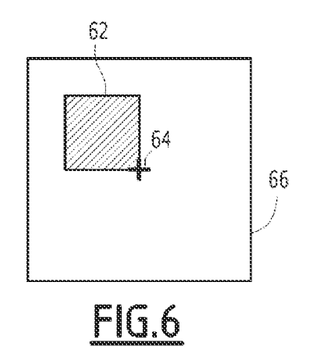
FIG. 6 shows an effective sintering zone according to another embodiment of the invention.

According to another embodiment, illustrated in FIG. 6, in the event the manufacturing device is made according to the second embodiment described above in which it comprises a so-called "third axis" device 24 and not a flat field lens 22, it is advantageous to position the effective sintering zone 62 off-centered relative to the optical axis 64, while being positioned inside the maximum sintering zone 66 corresponding to the current position of the galvanometric head.

Indeed, this off-centering is such that it makes it possible to maximize the reflexivity level of the mirrors in order to minimize the variations in characteristics of the laser beam. For example, M1 refers to the mirror 1, which has an incidence angle with the laser beam of $\alpha 1=45°$ when the laser beam is situated at the normal of the sintering plane, i.e., on the reference 64 in FIG. 6, and M2 refers to the mirror 2, which has an incidence angle with the laser beam of $\alpha 2=38.5°$ when the laser beam is situated at the normal of the sintering plane in reference 64 of FIG. 6. As previously indicated, the optimum amplitude of each of the mirrors is approximately 6° to 7°, ideally the travel angle of M1 is from 39° to 45° and of M2 is from 31.2° to 38.2°, which positions the sintering zone offset according to FIG. 6.

Figure 7:
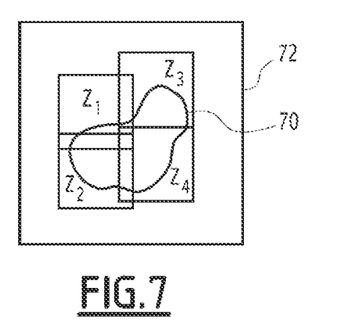
FIG. 7 shows the coverage of a two-dimensional section of a three-dimensional object to be manufactured.

According to one embodiment illustrated in FIG. 7, to perform the treatment of the two-dimensional section 70 of an object, it is also provided to position the galvanometric head in successive positions corresponding to the overlapping zones, denoted $Z_1, Z_2, Z_3$ and $Z_4$, in order to suitably cover the surface to be sintered, without covering the global sintering zone 72. Thus, in this embodiment, the effective sintering zones and the associated positions of the galvanometric head are done based on the two-dimensional section to be treated.

Similarly, if the object to be manufactured comprises several two-dimensional sections in the layer undergoing treatment, the same strategy for dividing into effective zones and positioning the galvanometric head applies for each zone, without sweeping the achievable global sintering zone, in order to optimize the manufacture of the object.

Figure 8:
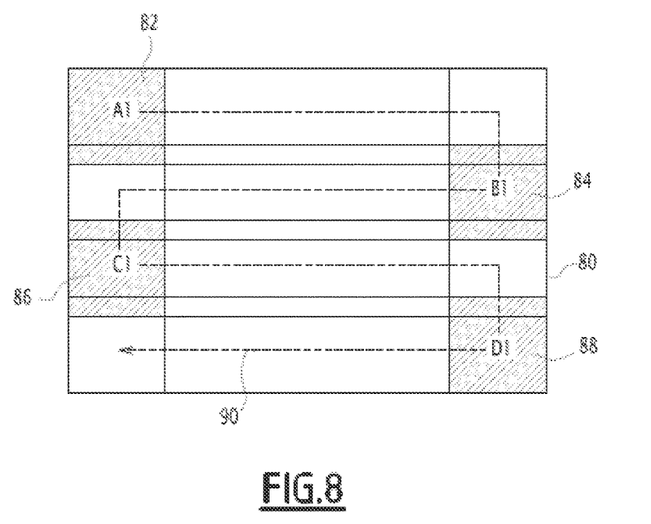
FIG. 8 shows the path of the galvanometric head between several effective sintering zones according to one embodiment of the invention.

FIG. 8 shows a top view of a global sintering zone 80 in which only four effective sintering zones 82, 84, 86 and 88 are treated. In that case, the galvanometric head is successively placed in four spatial positions each making it possible to produce effective sintering zones. The arrow 90 illustrates the movement of the galvanometric head. According to this alternative embodiment, the application of the laser beam is done continuously, including during the translational movement of the galvanometric head, in order to avoid a stop followed by a subsequent restart of the electromagnetic radiation source.

For the various embodiments explained above, a two-dimensional section of an object to be manufactured is treated layer by layer, and for each layer, the application of the laser beam is done in several effective sintering zones, as well as positioning of the galvanometric head suitable for each of the effective sintering zones.

Figure 9:
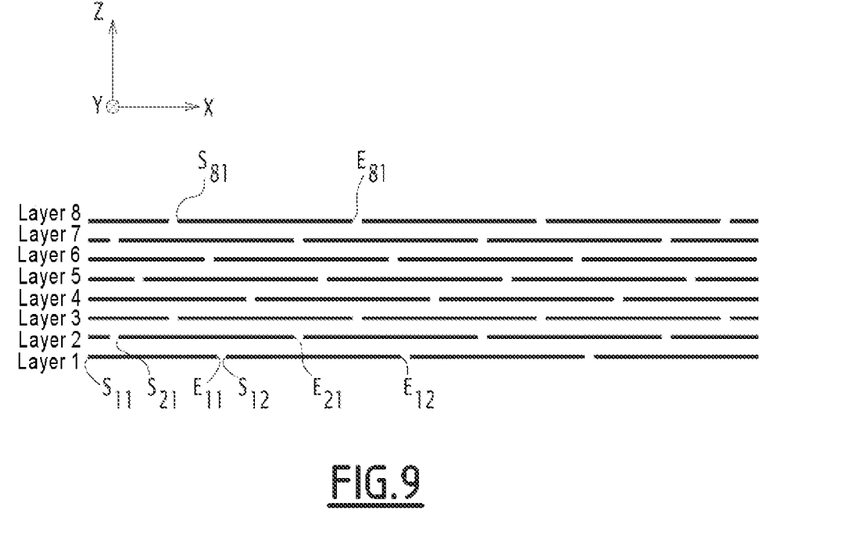
FIG. 9 diagrammatically shows the positioning of the galvanometric head using successive layers.

According to another embodiment, in order to prevent any discontinuity effects between effective sintering zones from being reinforced by the treatment using successive layers, it is proposed to offset the positioning of the effective sintering zones between two successive layers, as illustrated in FIG. 9.

FIG. 9 diagrammatically illustrates, in cross-section, an example of positions of the effective sintering zones on several successive layers.

In this example, five effective sintering zones are considered in one layer, those zones being slightly offset. In cross-section, each zone i of the layer j is delimited by a zone starting point $S_{ji}$ and a zone ending point $E_{ji}$. The figure shows several zone starting and ending points, respectively denoted $S_{11}$, $E_{11}$, $S_{12}$, $E_{12}$, $S_{21}$, $E_{21}$ and $S_{81}$, $E_{81}$. In this embodiment, the zone starting points, and consequently also the ending points, are offset between two successive layers, for example points $S_{11}$ and $S_{21}$, which are the starting points of the first effective zone of layer 1 and layer 2, respectively.

It should be noted that the space between the ending point of an effective zone and the starting point of a subsequent sintering zone are offset in the illustration of FIG. 9, but may alternatively be combined. The offset from one layer to the next is also applied in that case, in order to avoid the surface effects on the borders of the effective sintering zones.

Similarly, the positioning offset between effective sintering zones between two successive layers also applies when the effective sintering zones have an overlap.

In order to increase the productivity of the device for the manufacture of a three-dimensional object using layers without losing any quality, it is considered to equip the device with several optical treatment chains, each comprising an electromagnetic radiation source and a galvanometric head, simultaneously making it possible to direct several laser beams on a sintering field.

Figure 10:
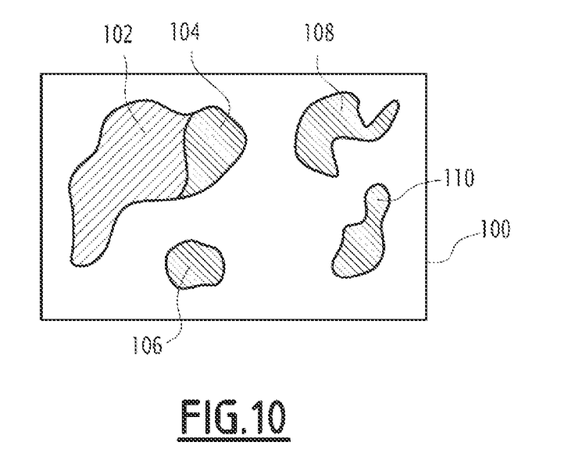
FIG. 10 diagrammatically shows two-dimensional sections of a layer to be solidified, respectively treated by laser beams coming from two different sources.

FIG. 10 illustrates a top view of a sintering field 100 comprising a zone 102 treated by a first laser beam coming from a first galvanometric head and zones 104, 106, 108, 110, treated by a second laser beam coming from a second galvanometric head. This example shows several two-dimensional sections to be treated. As can be seen in this figure, a two-dimensional section may either be treated in whole by a laser beam coming from only one of the two optical treatment chains, or in part by a first laser beam coming from a first galvanometric head and in part by a second laser beam coming from a second galvanometric head.

If two optical treatment chains are used, the global sintering zone can be divided into two equal or unequal parts, each part being assigned to one of the optical treatment chains. For each optical treatment chain, the sintering zone to be covered is divided into a plurality of effective sintering zones and the associated position of the galvanometric head is determined, according to the various alternatives described above.

The two optical treatment chains being independent of one another, any positioning parameter of the galvanometric head and the effective sintering zone associated with it is done independently, optimized relative to each layer of the object to be manufactured.

Preferably, the division into parts assigned to the optical treatment chains is such that the two chains finish treating a layer of an object to be manufactured at the same time. Thus, the treatment time and therefore the productivity of the manufacturing device are optimized.

Figure 11:
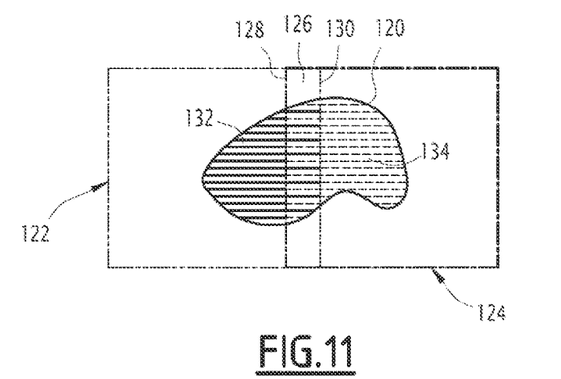
FIG. 11 shows a detailed view of an example of laser beam paths between two effective sintering zones.

When two optical treatment chains are used each comprising a galvanometric head able to direct the laser beam on the sintering field, it is recommended to treat the overlap zone specifically, as illustrated in FIG. 11, so as to avoid any border effect, in particular to avoid local weakening of the mechanical or metallurgical properties of the object being manufactured.

As already explained above, for a given position of the galvanometric head, the laser beam is oriented along a series of paths, for example rectilinear paths, traveling the two-dimensional section of the object to be manufactured that is situated in the effective sintering zone, thereby allowing progressive solidification of the material of the layer being manufactured.

FIG. 11 shows a top view of a two-dimensional section 120 of an object to be manufactured, treated by laser beams coming from two galvanometric heads, a first galvanometric head A (not shown) have an effective sintering zone 122 and a second galvanometric head B (not shown) having an associated effective sintering zone 124. The effective zones 122 and 124 overlap on an overlap zone 126, delimited by an edge 128 of the effective sintering zone 124 and an edge 130 of the effective sintering zone 122.

The first of galvanometric head is able to trace paths 132, which are horizontal rectilinear paths, each defined by two points, one point belonging to the geometric contour of the two-dimensional section to be treated and one point situated on one of the edges 128 or 130 of the overlap zone 126.

Similarly, the second galvanometric head is able to trace paths 134, which are horizontal rectilinear paths, each defined by two points, one point belonging to the geometric contour of the two-dimensional section to be treated and one point situated on one of the edges 128 or 130 of the overlap zone 126.

Preferably, as illustrated in the figure, the paths are interlaced in the overlap zone 126; every other path is therefore applied by a same galvanometric head. Thus, for example, for the paths 132, every other path has an endpoint on the edge 128, the following path having an endpoint on the edge 130. Similarly, the paths 134 are also traced as far as the edge 128, or as far as the edge 130. When the lasing is applied by two galvanometric heads at the same time, the entire section 120, including the overlap zone, is done in parallel.

It should be noted that such interlacing of the paths in the overlap zone 126 can also be done when the zones 122 and 124 are two effective sintering zones corresponding to two different positions of the galvanometric head of a single optical treatment chain. In this case, it suffices to define the paths to be applied in each effective sintering zone using an interlacing strategy (for example, every other path, as above). Then, when the galvanometric head is positioned in a first position having the effective sintering zone 122 as associated sintering zone, the laser beam is applied along all of the paths 132, and next, when the galvanometric head is positioned in the second position having an effective sintering zone 124 as associated sintering zone, the laser beam is applied along all of the paths 134.

Thus, the same result as above is obtained in the overlap zone, by lasing applied in two stages, and not substantially simultaneously as in the case where two optical treatment chains are used.

Figure 12:
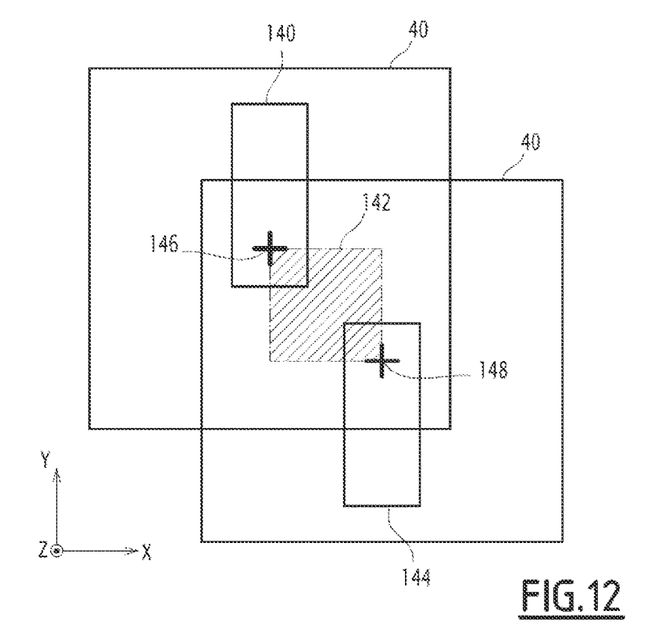
FIG. 12 shows an effective sintering zone shared by two galvanometric heads.

FIG. 12 illustrates an alternative embodiment of the invention with two optical treatment chains, suitable when the galvanometric head of each optical treatment chain comprises a so-called "third axis" device for which an off-centered effective sintering zone is considered, without penalizing the quality and homogeneity of the treatment.

FIG. 12 illustrates a diagrammatic top view in which a first galvanometric head 140 has an off-centered associated effective sintering zone 142. The galvanometric head 144 also has the zone 142 as associated effective sintering zone. The respective optical axes of each of the galvanometric heads are marked by an x 142 and 148 in the figure. Thus, the two galvanometric heads act on the same effective sintering zone and allow simultaneous treatment of the layer of an object in that sintering zone 142. The manufacturing productivity is thus optimized. This embodiment with a "third axis" device makes it possible to optimize the quality of the laser beam over an entire given sintering zone on a single and same object.

Figure 13:
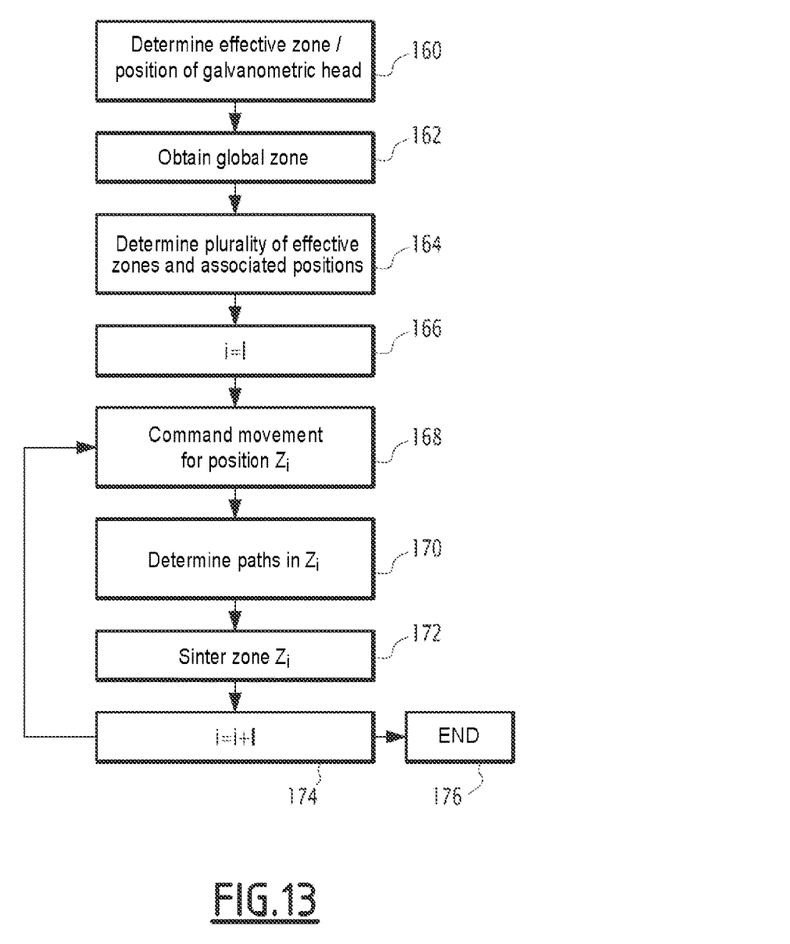
FIG. 13 is a flowchart of a method for manufacturing three-dimensional objects by laser sintering using layers according to one embodiment of the invention.

FIG. 13 is a flowchart of a method for manufacturing three-dimensional objects using layer-by-layer sintering according to one embodiment of the invention.

Such a method is implemented, in the preferred embodiment, by the software means 32 and 34 of the central unit 20, which can control a galvanometric head of a device for the manufacture of objects by sintering using layers.

For a current layer of a three-dimensional object to be manufactured by laser sintering, a first step 160 of the method consists of determining an effective sintering zone associated with a given position of the galvanometric head of the device. The determination of an effective zone consists of determining its dimensions and its position relative to a maximum sintering zone associated with a given position of the galvanometric head. Thus, knowing the position of the galvanometric head, it is possible to deduce the position of the associated effective sintering zone in the sintering field, and conversely, knowing the position of the associated effective sintering zone in the sintering field, it is possible to deduce the associated position of the galvanometric head therefrom.

The various alternatives described above, in particular the positioning centered in the maximum sintering zone or the off-centered positioning, are considered.

According to one alternative, this step 160 is carried out once before treatment of the set of layers of the object to be manufactured, rather than once for each layer to be treated.

Next, one or more zones to be treated, forming a global sintering zone, are obtained in step 162.

According to a first alternative, a global sintering zone is a rectangular or square zone with a predetermined size.

According to a second alternative, a global sintering zone is determined as being the two-dimensional section corresponding to the current layer of the object to be manufactured.

Next, step 164 makes it possible to determine a plurality of effective zones making it possible to cover all of the zones of the global sintering zone to be treated. Because the effective sintering zones have a fixed size obtained in step 160, in step 164 it is necessary to determine a plurality of spatial positions for each effective sintering zone in the sintering field in order to obtain coverage of the global sintering zone, using a coverage strategy. As explained above, the coverage may be done by adjacent effective zones or effective zones having overlaps.

Furthermore, the positioning of each effective zone may, according to an alternative illustrated above in FIG. 9, depend on the positioning of the effective zones in a previously treated layer, if one exists. To implement this alternative, it is useful to store the positions, for example of the upper left corner, of each effective zone in a treated layer in order to use those positions to select the positions of the effective zones in the following layer. An offset by a predetermined value, which may be approximately one half-zone, is then applied.

The zones of the plurality of effective sintering zones making it possible to cover the entire global sintering zone are sequenced in a given order, for example a travel order of the sintering field from left to right and from top to bottom.

Each effective sintering zones Zi has an associated position of the galvanometric head Pi, as explained above in reference to step 160.

Next, a counter i is initialized at 1 in step 166, the counter being designed to designate the effective sintering zones in the chosen order.

In step 168, a positioning command [orders] positioning of the galvanometric head in the position Pi corresponding to the zone Zi. In practice, as explained in reference to FIG. 2, means for translating the galvanometric head are implemented to reach a given spatial position.

A step 170 for determining paths to be done by the laser beam in the effective sintering zone Zi, based on the two-dimensional section of the object to be manufactured, is implemented. It should be noted that the determination of the paths for each effective sintering zone Zi can also be done beforehand, for example after step 164.

In one alternative embodiment, in step 170, the definition of the paths takes into account the existence of an overlap zone between two successive zones, as explained above in reference to FIG. 11, the paths then being defined so as to be interlaced with each other in the overlap zone.

The effective sintering is done by applying the laser beam using the galvanometric head along the paths defined in the zone Zi in step 172. The sintering options, for example the travel order of the paths and the starting point of a path, are applied using known methods.

Next, the index i is incremented by one and it is verified whether an effective zone with index i remains to be treated in step 174.

In the event an effective zone remains to be treated, the method returns to step 168 for commanding the movement of the galvanometric head. According to the alternative embodiments described above, the laser sintering may or may not be continuous during the translational movement.

Otherwise, the method ends in step 176.

Alternatively, the laser sintering is done along predetermined paths corresponding to several effective sintering zones, in order to optimize the manufacturing time, as explained above in reference to FIG. 8, which causes a movement of the galvanometric head before having finished all of the paths defined by a given effective sintering zone.

Various embodiments have been described above, but the invention is not limited to those embodiments and comprises alternatives within the reach of one skilled in the art. In particular, what has been described above with two optical treatment chains applies equivalently for any number of optical treatment chains, the application in no way being limited to the use of only two optical treatment chains.

The invention claimed is:

1. A device for the manufacture of three-dimensional objects by way of a plurality of successive superimposed layers, which for each layer of an object to be manufactured, applies a laser beam treatment to powdery or liquid material placed in a sintering field, said device comprising:
    a galvanometric head with a steering apparatus for steering a laser beam from a location in a plane above a plane of said sintering field toward a maximum sintering zone within the plane of said sintering field;
    a limiter that limits the steering of the laser beam to illuminating points within an effective sintering zone situated inside said maximum sintering zone, said effective sintering zone having an area smaller than said maximum sintering zone,
    the steering apparatus and limiter configured to cause the laser to trace paths along the sintering field inside the effective sintering zone to solidify a two-dimensional section of the powdery or liquid material placed within the effective sintering zone;
    a movement apparatus that moves said galvanometric head within the plane above the plane of said sintering field; and
    a controller that controls the movement apparatus in order to position said galvanometric head into any of a plurality of different positions within the plane above the plane of said sintering field,
    wherein each of said different positions of said galvanometric head is associated with a corresponding different effective sintering zone,
    wherein a plurality of said effective sintering zones define a global sintering zone,
    wherein said effective sintering zones of said global sintering zone comprise overlap zones in which adjacent effective sintering zones overlap, and
    wherein, within an overlap zone, the controller causes a path of the laser of a first adjacent sintering zone to interlace with a path of the laser of a second adjacent sintering zone overlapping with the first adjacent sintering zone.

2. The device according to claim 1, wherein one of said plurality of effective sintering zones is centered in said maximum sintering zone, around a point corresponding to a normal incidence of said laser beam on the sintering field.

3. The device according to claim 1, further comprising:
    a deflector that deflects the laser beam and a device that focuses said laser beam in the sintering field placed upstream from said deflector,
    wherein the effective sintering zone is off-centered relative to said maximum sintering zone.

4. The device according to claim 1, wherein the global sintering zone is a two-dimensional section of a three dimensional object to be manufactured.

5. An installation for the manufacture of three-dimensional objects using superimposed layers, comprising at least two devices for the manufacture of three-dimensional objects according to claim 1, said at least two devices each being able to steer a laser beam toward a same shared sintering field.

6. The device according to claim 1, wherein, for each successive superimposed layer applied by the device, the controller controls the movement apparatus so as to offset a positioning of the effective sintering zones between said successive superimposed layers, such that overlap zones of a first layer are offset from overlap zones of a succeeding second layer.

7. A method for the manufacture of three-dimensional objects using superimposed layers where, for each of said layers, a laser beam treatment is carried out upon powdery or liquid material placed in a sintering field, said method comprising:
    determining a plurality of effective sintering zones within said sintering field, each effective sintering zone positioned inside said sintering field, said effective sintering zones suitable for covering said at least one global sintering zone of said sintering field, and determining a corresponding position of said galvanometric head above said sintering field for each of said effective sintering zones; and
    for each of said effective zones, controlling movement of said galvanometric head to locate said galvanometric head at the corresponding position of said effective zone, and causing a laser beam of said galvanometric head to apply a laser beam treatment in the effective sintering zone associated with the position of the galvanometric head while the galvanometric head remains at the position of said effective zone,
    wherein at least two adjacent effective sintering zones of said plurality of sintering zones comprise an overlap zone where said two adjacent effective zones overlap with each other, and
    wherein, in applying the laser beam treatment for said two adjacent effective zones, the laser beam, within the overlap zone of said two adjacent effective zones, follows respective scanning paths, the respective paths within the overlap zone interlacing each other.

8. The method according to claim 7, wherein in the step for determining a plurality of effective sintering zones, a positioning of each effective sintering zone takes into account a predetermined positioning of effective sintering zones for a layer preceding the layer of the powdery or liquid material currently treated.

9. The method according to claim 7, wherein in the step for determining a plurality of effective sintering zones, a positioning of the effective sintering zones are determined so as to be offset between successive superimposed layers, such that overlap zones of a first layer are offset from overlap zones of a succeeding second layer.

* * * * *